United States Patent
Shapira (10) Patent No.: US 10,154,502 B2
(45) Date of Patent: Dec. 11, 2018

(54) METHOD FOR MANAGING THE SPECTRUM OF A MULTI-BAND WIRELESS COMMUNICATION SYSTEM

(75) Inventor: Nir Shapira, Ra'anana (IL)

(73) Assignee: Celeno Communications Ltd., Ra'anana (IL)

( * ) Notice: Subject to any disclaimer, the term of this patent is extended or adjusted under 35 U.S.C. 154(b) by 90 days.

(21) Appl. No.: 13/544,568

(22) Filed: Jul. 9, 2012

(65) Prior Publication Data

US 2013/0010719 A1    Jan. 10, 2013

Related U.S. Application Data

(60) Provisional application No. 61/505,343, filed on Jul. 7, 2011, provisional application No. 61/542,627, filed on Oct. 3, 2011.

(51) Int. Cl.
| | |
|---|---|
| *H04W 74/00* | (2009.01) |
| *H04W 72/08* | (2009.01) |
| *H04W 88/06* | (2009.01) |
| *H04W 36/06* | (2009.01) |
| *H04W 24/00* | (2009.01) |
| *H04W 72/02* | (2009.01) |
| *H04W 28/18* | (2009.01) |

(52) U.S. Cl.
CPC .......... *H04W 72/082* (2013.01); *H04W 24/00* (2013.01); *H04W 28/18* (2013.01); *H04W 36/06* (2013.01); *H04W 72/02* (2013.01); *H04W 88/06* (2013.01)

(58) Field of Classification Search
CPC ... H04W 72/082; H04W 24/00; H04W 36/06; H04W 72/02; H04W 88/06

USPC .......................................................... 370/329
See application file for complete search history.

(56) References Cited

U.S. PATENT DOCUMENTS

| | | | | |
|---|---|---|---|---|
| 8,711,748 | B2 * | 4/2014 | Seok ..................... | H04W 36/06 370/311 |
| 9,072,018 | B2 * | 6/2015 | Sharma ................. | H04W 36/06 |
| 2004/0077353 | A1 * | 4/2004 | Mahany ........................ | 455/448 |
| 2009/0274224 | A1 * | 11/2009 | Harris ..................... | H04L 1/003 375/260 |
| 2010/0074190 | A1 * | 3/2010 | Cordeiro et al. ............. | 370/329 |
| 2011/0065440 | A1 * | 3/2011 | Kakani ................. | H04L 1/0022 455/450 |
| 2011/0128858 | A1 * | 6/2011 | Matta et al. ................... | 370/241 |

(Continued)

OTHER PUBLICATIONS

IEEE-Std 802.11, 1999 Edition (ISO/IEC 8802-11: 1999); Part 11: Wireless LAN Medium Access Control (MAC) and Physical Layer (PHY) Specifications; Aug. 20, 1999.

(Continued)

*Primary Examiner* — Mewale Ambaye
(74) *Attorney, Agent, or Firm* — Pearl Cohen Zedek Latzer Baratz LLP (57) ABSTRACT

System and method for managing the spectrum of a multi-channel wireless communication system. Information related to other channels and bands is exchanged between a client associated to a first channel of the multi-channel wireless communication system and a multi-channel access point. The information includes, inter alia, capabilities of the access point and the client, working channel information of the access point, link quality metrics of the client in the other bands etc.

31 Claims, 3 Drawing Sheets

(56) References Cited

U.S. PATENT DOCUMENTS

| | | | | |
|---|---|---|---|---|
| 2011/0255401 A1* | 10/2011 | Seok | ..................... | H04W 48/20 |
| | | | | 370/230 |
| 2011/0255455 A1* | 10/2011 | Seok | ..................... | H04W 36/06 |
| | | | | 370/311 |
| 2011/0275359 A1* | 11/2011 | Sebire | .................... | H04L 5/001 |
| | | | | 455/422.1 |
| 2015/0282032 A1* | 10/2015 | Gupta | ................... | H04W 36/22 |
| | | | | 370/237 |

OTHER PUBLICATIONS

IEEE-Std 802.11b-1999 Supplement to 802.11-1999, Part 11: Wireless LAN Medium Access Control (MAC) and Physical Layer (PHY) Specifications: Higher Speed Physical Layer (PHY) Extension in the 2.4 GHz Band; Jan. 20, 2000.

IEEE-Std 802.11a-1999 Part 11: Wireless LAN Medium Access Control (MAC) and Physical Layer (PHY) Specifications: High Speed Physical Layer (PHY) Extension in the 5 GHz Band; Dec. 30, 1999.

IEEE-Std 802.11n-2009;Part 11: Wireless LAN Medium Access Control (MAC) and Physical Layer (PHY) Specifications: Higher Speed Physical Layer (PHY); Amendment 5: Enhancements for Higher Throughput; Oct. 29, 2009.

\* cited by examiner

METHOD FOR MANAGING THE SPECTRUM OF A MULTI-BAND WIRELESS COMMUNICATION SYSTEM

CROSS REFERENCE TO RELATED APPLICATIONS

This application claims the benefit of U.S. Provisional Application Ser. No. 61/505,343, filed on Jul. 7, 2011 and entitled MULTI BAND OPERATION, and of U.S. Provisional Application Ser. No. 61/542,627, filed on Oct. 3, 2011 and entitled MULTI BAND OPERATION, the entire content of which is incorporated herein by reference.

FIELD OF THE INVENTION

The present invention relates to the field of wireless communication. In particular, embodiments of the present invention relate to a method for managing the spectrum of a multi-band wireless communication system.

BACKGROUND OF THE INVENTION

Wireless local area network (WLAN) systems that support operation in several bands are becoming more common A typical example is an Access point (AP) or a client device that can support operation in both the 2.4 GHz and 5 GHz bands, for example conforming to IEEE 812.11n communication standard. In some cases the AP or the client device may operate in both bands concurrently, while in other cases the client device may work at a given time slot in either one of the bands, non-concurrently. A concurrent dual band AP is more common than a concurrent dual band client. Usually a client device, even if it is dual band capable, would be configured to work in one of the two bands.

Historically, most WLAN devices worked in the 2.4 GHz band, which has only three 20 MHz channels available. As a result, the 2.4 GHz band is usually crowded with a variety of networks and interference sources, and high quality or service (QoS) level may not be maintained. The 5 GHz band, on the other hand, offers many more channels. Therefore, WLAN devices working in the 5 GHz band may be able to choose a substantially interference free channel and to guaranty a high level of QoS.

WLAN systems that support operation in several bands may offer flexibility in band and channel allocation. In some cases, for example, high QoS streams, like high definition (HD) video, would be carried in the 5 GHz band, while streams with less priority, like file transfer, would be carried in the 2.4 MHz band.

In some cases, for ease of operation, a concurrent dual band AP may use the same service set identifier (SSID) and/or basic service set identification (BSSID) in both bands. A non-concurrent dual band client may typically scan the spectrum before association and see the AP in both bands. It would then need to decide in which band to connect to the AP.

One of the practical problems with operation in multi-bands communication systems is how to manage the spectrum. There is currently no provision in the published WLAN standards for controlling the working band of a client device. While there is a provision for moving the entire basic service set (BSS) to a different channel using the dynamic frequency selection (DFS) procedure, this does not solve the problem of how to assign/move a specific client device to a different band.

SUMMARY OF THE INVENTION

According to embodiments of the present invention there is provided a method for managing the spectrum of a multi-channel wireless communication system, the method may include: exchanging information between a client associated to a first channel of the multi-channel wireless communication system and a multi-channel access point, the information related to at least one other channel in which the access point is established.

Furthermore, according to embodiments of the present invention, the first channel may pertain to a first band and each of the at least one other channel may pertain to one of the at least one other band.

Furthermore, according to embodiments of the present invention, exchanging information may include: notifying the client by the multi-channel access point, capabilities of the multi-channel access point in the at least one other band.

Furthermore, according to embodiments of the present invention, notifying the capabilities of the access point in the at least one other band may be done by periodically sending a Beacon frame in the first channel, wherein at least one beacon frame may include the capabilities in the at least one other band.

Furthermore, according to embodiments of the present invention, notifying the capabilities of the access point in the at least one other band may be done as a response to a request of the client.

Furthermore, according to embodiments of the present invention, notifying the capabilities of the access point in the at least one other band may be done following a change in the capabilities of the access point in one of the at least one other channels.

Furthermore, according to embodiments of the present invention, the method may include: using, by the client, the capabilities of the access point in the at least one other band to perform activities required for operating in a second channel pertaining to a second band, before moving to the second channel, wherein these activities require knowledge of the capabilities of the access point in second band, and wherein the second band is one of the at least one other band.

Furthermore, according to embodiments of the present invention, exchanging information may include: notifying the client by the multi-channel access point, working channel information of the access point in the at least one other band.

Furthermore, according to embodiments of the present invention, notifying the client may be performed in case an access point switches channel in the at least one other band.

Furthermore, according to embodiments of the present invention, if the client switches to communicate with the access point on a channel pertaining to a second band, the client may use the working channel information and may not scan the second band for a working channel of the access point, wherein the second band is one of the at least one other band.

Furthermore, according to embodiments of the present invention, the working channel information comprises bandwidth of the at least one other channel, primary channel location and secondary channel location.

Furthermore, according to embodiments of the present invention, the method may include: scanning by the client the first band, detecting the multi-channel access point in the first band by the client, and obtaining by the client form the access point the working channel information of the access point in the at least one other band.

Furthermore, according to embodiments of the present invention, the method may include: moving, by the client, to a channel pertaining to a second band, the channel indicated in the working channel information of the second band, wherein the second band is one of the at least one other band.

Furthermore, according to embodiments of the present invention, the first band has fewer channels than the second band.

Furthermore, according to embodiments of the present invention, the capabilities of the access point may include Quality of Service information of the access point in the at least one other band.

Furthermore, according to embodiments of the present invention, the method may include: deciding by the client to which of the bands to associate, based on the Quality of Service information.

Furthermore, according to embodiments of the present invention, exchanging information may include: obtaining at the multi-channel access point from the client link quality metrics of the client in the first channel and in the at least one other channel, allocating the client to a selected channel based on the link budget and interference condition data, and steering the client to the selected channel.

Furthermore, according to embodiments of the present invention, link quality metrics may include link budget and interference condition.

Furthermore, according to embodiments of the present invention, the method may include: planning a load balancing scheme based on the link quality metrics, wherein allocating the client to the selected channel may be based on the load balancing scheme.

Furthermore, according to embodiments of the present invention, the method may include: measuring by the client the link quality metrics of the client in the first channel and in the at least one other channel, and conveying by the client the link quality metrics to the access point.

Furthermore, according to embodiments of the present invention, obtaining the quality metrics of the client in the at least one other channel may include: associating the client to a first channel, measuring by the client the link quality metrics of the client in the first channel, instructing the client to move to another channel, and repeating the steps of associating, measuring and instructing for the plurality of channels.

Furthermore, according to embodiments of the present invention, the method may include: deciding whether to admit a particular stream based on the link quality metrics of the client.

Furthermore, according to embodiments of the present invention, the method may include: performing renegotiation with the client concerning new agreements for communicating in a second channel, the renegotiation being performed in the first channel, wherein the second channel is one of the at least one other channel, associating the client to the second channel, and exchanging traffic in the second channel using the new agreements.

Furthermore, according to embodiments of the present invention, associating the client may include: sending by the access point to the client a band change request, wherein the band change request comprises the new agreements.

Furthermore, according to embodiments of the present invention, the new agreements may include: security settings, block acknowledgment (block ACK) session, traffic specification (TSPEC).

Furthermore, according to embodiments of the present invention, exchanging information may include: notifying the multi-channel access point by the client, capabilities of the client in the at least one other band.

Furthermore, according to embodiments of the present invention, the method may include: requesting the client by the multi-channel access point to provide the multi-channel access point the capabilities of the client in the at least one other band.

Furthermore, according to embodiments of the present invention, the capabilities of the client may include supported modulation and coding schemes and a number of supported spatial streams.

Furthermore, according to embodiments of the present invention, the method may include: using, by the multi-channel access point, the capabilities of the client in a second band to plan resource allocation in the second band before switching to a second channel, wherein the second channel pertains to a second bend, and wherein the second band is one of the at least one other band.

Furthermore, according to embodiments of the present invention, the method may include: deciding by the multi-channel access point to switch band for the client based on the capabilities of the client in the at least one other band.

Furthermore, according to embodiments of the present invention, notifying the multi-channel access point, the capabilities of the client in the at least one other channel may be done following a change in the capabilities of the client in one of the at least one other channels.

Furthermore, according to embodiments of the present invention, exchanging information may include: notifying the client by the multi-channel access point, that the multi-channel access point is operating in the first channel and in the at least one other channel concurrently.

Furthermore, according to embodiments of the present invention, the method may include: concluding by the client that the multi-channel access point has scanned for radars in the at least one other channel and that the at least one other channels are radar free, and avoiding scanning for radars when being switched to one of the of at least one other channel.

Furthermore, according to embodiments of the present invention, exchanging information may include: notifying by the access point to the client, a timer setting which defines a time duration in which the air medium is reserved in a second band, before a band switch, wherein the second band is one of the at least one other band.

Furthermore, according to embodiments of the present invention, the method may include: switching to the second band, and initiating data transmission by the client in the second band after the timer setting expires.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

It should be understood that the present invention may be used in a variety of applications. Although the present invention is not limited in this respect, the circuits and techniques disclosed herein may be used in many apparatuses such as wireless communication system, digital communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

As used herein a band may refer to a group of channels, and a channel may refer to a radio frequency range used for communication between two stations of a wireless network. Bands and channels may be defined, for example, in an appropriate wireless communication standard. For example, 5 GHz band and related channels are defined by IEEE 802.11a standard, and the 2.4 GHz band and related channels are defined by the IEEE 802.11b standard. However, other RF channels may be used in compliance with other wireless communication standards. Embodiments of the present invention are not limited to a specific RF frequency channels or wireless communication standard.

Managing the spectrum of a multi-band or a multi-channel wireless communication system requires controlling the band, as well as the channel of the clients. Usually a basic service set (BSS) of a multi-band wireless communication system works concurrently in a plurality of channels, for example, one in each band. Embodiments of the present application are aimed at providing method for managing the spectrum in the plurality of channels and bands, including methods for seamless channel switch. The decision of how to allocate clients to channels and bands may typically be implementation specific. It may typically account for traffic quality of service (QoS) requirements, for link budget in each channel, for interference scenario in each channel, and for overall load balancing between channels.

Various wireless communication standards define protocols for channel switch within the same band. For example IEEE 812.11 includes Tunneled Direct Link Setup (TDLS) channel switch protocol, which defines timing constraints, and dynamic frequency selection (DFS) protocol, which is best effort and does not handle error conditions. However, these prior art protocols are designed for a scenario in which both the access point (AP) and the client operate in a single channel at every point in time. Therefore, the prior art protocols are not optimal for channel switch operation in which either the access point, the client or both are established in more than one channel contemporaneously. Prior art band switch protocols assume that both the AP and the client are present only in the used channel and therefore should perform "channel initialization" procedures before starting to transmit in the second channel. These "channel initialization" procedures may include, for example, channel scanning for the presence of radar systems which is many times obligatory according to FCC regulations. However, in case of multi-channel station, such as multi-channel AP, the multi-channel station is already established in the other band, while the second station, typically the client needs to do the band/channel switch.

Figure 1:
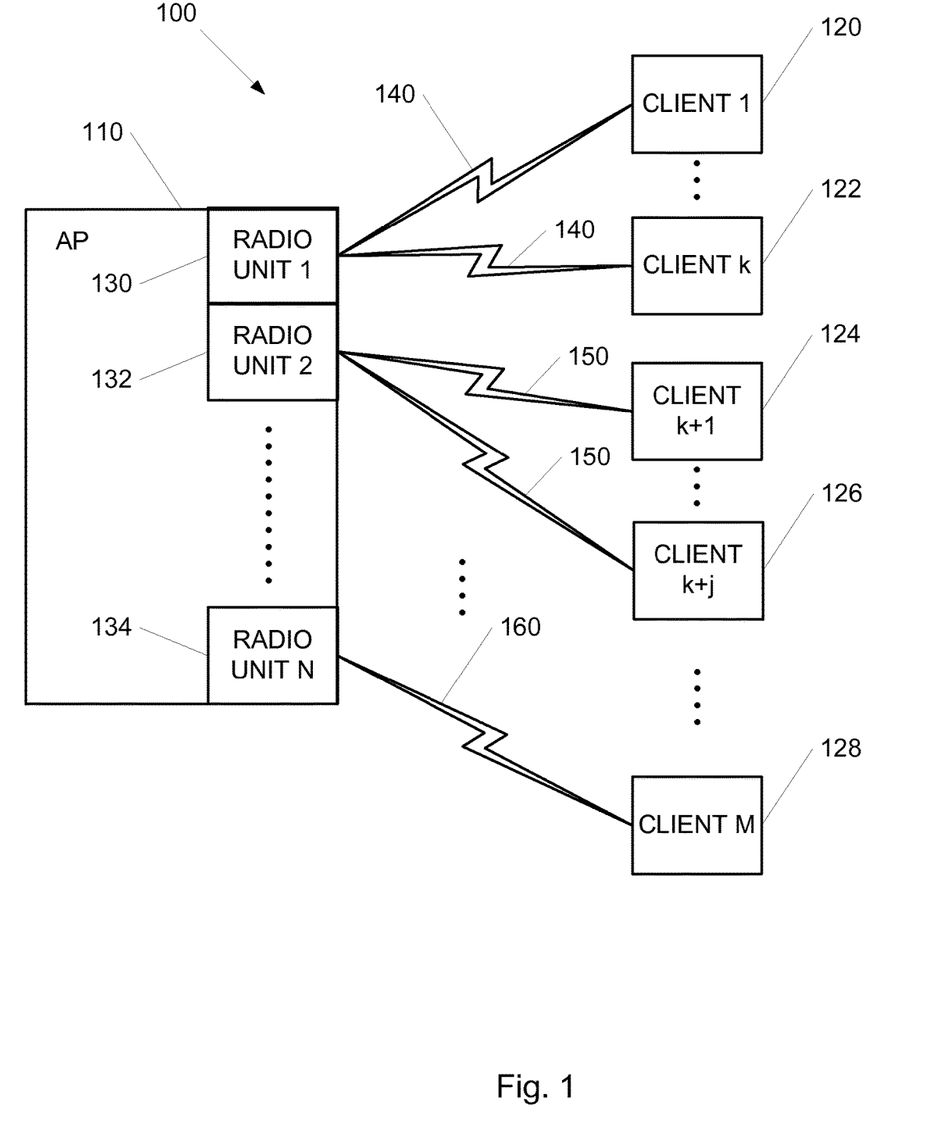
FIG. 1 is a schematic illustration of a multi-band wireless communication system in accordance with demonstrative embodiments of the present invention.

Reference is made to FIG. 1, which is a schematic illustration of a multi-channel wireless communication system 100 in accordance with embodiments of the present invention. It will be appreciated by those skilled in the art that the simplified components schematically illustrated in FIG. 1 are intended for demonstration purposes only, and that other components may be required for operation of the communication system. Those of skill in the art will further note that the connection between components in a communication system need not necessarily be exactly as depicted in the schematic diagram.

Although the scope of the present invention is not limited to this example, wireless communication system 100 may include a multi-channel access point (AP) 110. AP 110 may communicate with clients 120, 122, 124, 126 and 128, e.g. transmit and/or receive wireless communication signals to clients 120, 122, 124, 126 and 128. wireless communication system 100 may be referred to as multi-channel or multi-band BSS. AP 110 may transmit and/or receive various types of real time or best effort data to clients 120, 122, 124, 126 and 128. For example, AP 110 may distribute real time data such as video and/or audio steams e.g. digital television (DTV) streams, high definition television (HDTV) streams, etc.

Clients 120, 122, 124, 126 and 128 may include, for example, a wireless communication station or a wireless communication device capable of transmitting and/or receiving wireless communication signals.

Although the invention is not limited in this respect, AP 110 and clients 120, 122, 124, 126 and 128 may include a radio unit (not shown) including an antenna or a set of N antennas (not shown). The antennas may include an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, modules, frames, transmission streams, packets, messages and/or data.

According to embodiments of the present invention, AP 110 may communicate with clients 120, 122, 124, 126 and 128 over a plurality of channels 140, 150 and 160. In the non-binding example presented in FIG. 1 AP 110 may communicate with clients 1 to k, 120 and 122, over channel 140, with clients k+1 to k+j, 124 and 126, over channel 150, and with client m on channel 160. AP 110 may be a concurrent Multi-channel AP, e.g., AP 110 may be established in more than one channel contemporaneously, or a non-concurrent AP, e.g., AP 110 may be established in a single channel at any point in time. Clients 120, 122, 124, 126 and 128 may be single or multi-channel clients. It is assumed, however, that AP 110 communicates with each client over a single channel at any point in time.

According to some embodiments of the present invention, channels 140, 150 and 160 may operate in different channels of the same frequency band, or in different channels of different frequency bands.

According to embodiments of the present invention, each of clients 120, 122, 124, 126 and 128 may be associated to a specific channel, while AP 110 may be established in all channels 140, 150 and 160 of the Multi-channel BSS, however, AP 110 and clients 120, 122, 124, 126 and 128 may exchange information related to channels clients 120, 122, 124, 126 and 128 are not associated to, over the channel clients 120, 122, 124, 126 and 128 are associated to. The information may include any data or metric that may aid AP 110 and clients 120, 122, 124, 126 and 128 to manage the spectrum of system 100 efficiently, for example, information that may aid AP 110 to prepare a load balancing scheme and to decide to which channel to allocate each client. Additionally, the exchanged information may enable AP 110 and clients 120, 122, 124, 126 and 128 to perform substantially seamless band switch. For example, information may include link quality metrics, capabilities of AP 110 and clients 120, 122, 124, 126 and 128, working channel information, etc, as will be discussed in detail hereinbelow.

For clarity of the explanation, embodiments of the present invention will be described with relation to a representative client, e.g., client 120. As can be seen in FIG. 1 client 120 may be associated to channel 140. However, client 120 may switch to other channels e.g. channels 150 and 160, according to the system needs. Additionally it is assumed throughout the discussion hereinbelow that channel 150 pertains to a different band than channel 140.

According to embodiments of the present invention, AP 110 may obtain link quality metrics of client 120 in channels AP 110 is established, e.g. channel 140, to which client 120 is associated, as well as channels 150 and 160. Knowing the link quality metrics of a client, e.g. client 120, in the plurality of channels 140, 150 and 160 in which AP 110 is established may be useful information for AP 110 in order to make load balancing decisions and allocating clients to channels and bands. The link quality metrics may include, inter alia, link budget and interference condition. This information may be obtained before or after association of client 120 to a specific channel. In some embodiments client 120 may measure its link quality metrics in the plurality of channels 140, 150 and 160 before being associated to a specific channel, and convey this information to AP 110 upon association. For example, client 120 may measure received signal level of Beacon frames sent by AP 110. AP may then decide in which channel and band to associate client 120. Additionally or alternatively, client 120 may associate in one channel, e.g. channel 140. AP 110 may then send client 120, each time to one of other channels 150 and 160 to make measurements of the link quality metrics of client 120 in these channels. Optionally, since link quality is usually reciprocal, AP 110 may estimate the link quality. AP 110 may measure the link quality in channel 140 to which client 120 is associated and send client 120, each time to one of other channels 150 and 160 so that AP 110 may measure the link quality at channels 150 and 160.

Once AP 110 obtains link quality metrics of client 120 in the plurality of channels 140, 150 and 160, or at a sub-group of the plurality of channels 140, 150 and 160, AP 110 may decide to change channel allocation of client 120 based on the received link quality metrics, and may steer client 120 to a different channel.

Measurements of the link quality metrics may be done using established or propriety protocols. For example, measurements of the link quality metrics may be done using IEEE 802.11k measurement procedures. Alternatively, client 120 may record the received signal strength of frames received from AP 110 in the channels in which link quality metrics is being measured, and report the measured link quality metrics before or after association. For example, client 120 may record the received signal strength of a Beacon frame. As used herein, Beacon frames may be frames broadcasted by AP 110 in regular intervals to publish the existence of AP 110 in a particular channel and the capabilities of AP 110. Clients that do scanning to find AP 110 usually lookout for Beacons.

Link quality metrics may also be important for admission control. For example, AP 110 may use relevant link quality metrics to decide if AP 110 can admit a particular stream to a specific channel.

According to embodiments of the present invention, client 120 may measure its link quality metrics in channels 140, 150 and 160, and convey this information to AP 110 over channel 140. For example, client 120 may measure its link quality metrics at the different channels following an instruction from AP 110. For example, AP 110 may associate client 120 to channel 140 and client 120 may measure its link quality metrics at channel 140. AP 110 may then instruct client 120 to move to another channel, e.g. channel 150, and measure its link quality metrics at that channel. Client 120 may measure its link quality metrics at channel 150. In this manner, AP 110 may instruct client 120 to move each time to a different channel and measure its link quality metrics as that channel.

According to embodiments of the present invention, AP 110 may plan a load balancing scheme based on the link quality matrices of client 120 at the plurality of channels 140, 150 and 160, as well as on the link quality matrices of other clients 122, 124, 126 and 128 of wireless communication system 100. AP 110 may allocate each of clients 120, 122, 124, 126 and 128 to any of channels 140, 150 and 160 based on the load balancing scheme. Similarly, AP 110 may decide whether to admit a particular stream to client 120 based on the link quality metrics of client 120.

According to embodiments of the present invention, AP 110 may notify client 120 that AP 110 is operating in two channels concurrently. When client 120 switches channel, be that upon an autonomous decision or after being instructed by AP 110, it is sometimes desirable for client 120 to know that AP 110 is concurrent dual channel capable, and hence AP 110 is already operating in the new band/channel. For example, in case the new channel is a DFS channel, e.g., a channel where a client is supposed to scan for radars before commencing operation, or in case of a DFS slave device wait for an Enabling signal from the master AP, client 120 may know in advance that AP 110 is operating in the new channel and hence that AP 110 has already scanned for radars and has not detected any. Thus, client 120 may assume the new channel is radar free, may avoid scanning for radars when being switched to the new channel, and can start operation immediately.

The indication on the concurrent dual-band capability may be carried in various information elements. For example, the indication on the concurrent dual-band capability may be included in the Extended Channel Switch Announcement element, defined by IEEE 802.11 standard. By setting a concurrent dual-band bit, AP 110 may indicate that AP 110 already has an operating BSS at the new band/channel.

According to embodiments of the present invention AP 110 may notify client 120 of the capabilities of AP 110 in channels in which AP 110 is established that pertain to other bands. Similarly, client 120 may notify AP 110 of the capabilities of client 120 in channels that pertain to other bands. For example, AP 110 may notify client 120 of the capabilities of AP 110 in channel 150, and client 120 may notify AP 110 of the capabilities of client 120 in channel 150. The capabilities of AP 110 and client 120 may be different in each band. For example, AP 110 and client 120 may have different number of antennas in each band, different number of available RF chains in each band and hence may support different number of maximum spatial stream (which must be equal or lower than number of RF chains), may support a different MCS set, etc.

For example, AP 110 may publish to clients in each band, the capabilities of AP 110 in all bands. AP 110 may publish to clients in each band, the capabilities of AP 110 in all bands periodically, and/or as a request of client 120. For example, these capabilities may be published in beacon frames, wherein the beacon frames may include the capabilities of AP 110 in other bands. This is in contrast to prior art, in which a multi band AP would usually periodically send a Beacon in each band, wherein each beacon conveys the capabilities of the AP in the band in which it is published.

Publishing to client 120 the capabilities of AP 110 in all bands may enable client 120 to prepare in advance to the required changes in the link if client 120 is instructed to change band. Preparing in advance may include performing activities required for operating in another band, before moving to the other band, where these activities require knowledge of the capabilities of AP 110. For example, preparing in advance may include allocating buffer sizes, estimating required transmit power and over the air rate, etc. According to prior art, following a band change a client would have to wait for a beacon in the new band to learn the capabilities of AP 110 in the new band. As used herein a band change may refer to moving from a first channel to a second channel, where the second channel pertains to a different band than the first channel. According to embodiments of the present invention, this waiting period may be eliminated since client 120 may be notified the capabilities of AP 110 in the new band while still in the first band, before being requested to switch bands. In some embodiments of the present invention, capabilities of AP 110 in the new band may be sent to client 120 just prior or together with the command to change band.

According to some embodiments of the present invention, the capabilities of AP 110 may include Quality of Service (QoS) information of AP 110 in the other bands. For example, AP 110 may state its policy for assignment of Access Categories, e.g. priorities assigned to different service classes like Video, Data, Voice, Background, etc., to each band. Client 120 may decide to which of the bands to associate based on the Quality of Service information. For example, QoS information may include service class. AP 110 may signal that video should be served in a particular band while voice or data in another. Additionally or alternatively, AP 110 may signal the available free bandwidth in the other band, so that client 120 may decide if its traffic needs may be met in other bands. The Admission Control mechanism, as in Wi-Fi Multimedia Access Categories (WMM-AC), may be extended to include band information. For instance, AP 110 may include band allocation information in its response frame to a stream allocation request made by client 120.

Since publishing the capabilities of AP 110 in all bands in each Beacon frame may cause a large overhead, in some embodiments of the present invention, information on the other bands may be sent once every few Beacon intervals. In some embodiments the information relating to the other bands may be sent as a response to a specific request from the client device.

According to prior art, clients usually notify the AP of their capabilities in the channel they are associated to in Information Elements. An example for such an element is the High Throughput HT Capabilities element, defined in IEEE 802.11n that includes, amongst other information, the supported MCS set and the number of supported spatial streams. Similarly, other capabilities that may differ between bands may be carried in other information elements. The information elements are usually carried in Beacon frames (in case of an AP), and in other frames such as Probe Req/Response that are usually exchanged upon association. In each band, a station usually sends the information elements with the relevant capabilities for that band.

Hence, according to prior art, after a client associates with the AP in one of the bands, and before a decision is made in which band to serve the client, the AP would send the client to the other band to learn its capabilities. This operation can be done when the AP is concurrent dual-band capable. If the AP is dual-band non-concurrent, the AP needs to switch band as well. After the AP learns the capabilities of the client in all supported bands, the AP can decide which band to serve the client in, and instruct the client to switch band accordingly.

According to embodiments of the present invention, AP 110 may obtain the capabilities of client 120 in other bands that client 120 may be associated to. For example, AP 110 may obtain the capabilities of client 120 in channel 150, as well as in channel 140, where channels 140 and 150 pertain to different bands. Client 120 may notify AP 110 of the capabilities of client 120 in other bands periodically. Additionally or alternatively, AP may request client 120 to provide AP 110 the capabilities of client 120 in the other bands. Obtaining the capabilities of client 120 in other bands may be beneficial in case AP 110 is able to direct client 120 to switch bands. For example, knowing the capabilities of client 120 in the plurality of bands may enable AP 110 to prepare in advance to directing client 120 to a channel pertaining to another band in terms of resource allocation in the other band. For example, AP 110 may determine, before directing client 120 to a channel pertaining to another band, the resources that will be allocated for client 120 at the other band, e.g., time, power, bandwidth, or any other resource, that may be required to serve client 120. Also, obtaining the capabilities of client 120 in other bands may aid AP 110 in the band switch decision itself, particularly when such a band switch is made for load balancing purposes. Without having pre knowledge of capabilities of client 120 in other bands, AP 110 may need to order client 120 to switch to the other band just to learn its capabilities. This is a time consuming procedure, since client 120 may then need to re-associate or probe AP 110 in the other band.

To save the time of the band switching and capabilities exchange, client 120 may advertise its capabilities in all its supported bands while still operating in channel 140, pertaining to one of these bands. Client 120 may associate a particular information element to a specific band. For example, in IEEE 802.11, operation in each band or sub-band may be defined by an Operating Class parameter. Client 120 may associate an information element, or a group of information elements, with a band or operating class. The capabilities of client 120 in the plurality of bands may be carried in dedicated frames. For example, each of these dedicated frames may include a band/operating class identifier and a list of information elements of that band. For example, frames similar to the available frames in IEEE 802.11 standard for carrying information elements, e.g. Beacon, Probe Req, re-association, etc., may be used for publishing the capabilities of client 120, wherein each of these frames may include a band/operating class identifier in addition to the information elements.

According to some embodiments of the present invention, capabilities of client 120 may change dynamically. For example, client 120 may move to power saving state. If the capabilities of client 120 change in a particular band, client 120 may update its capabilities in each band for all bands, so that AP 110 is updated and may make intelligent load balancing decisions. Similarly, capabilities of AP 110 may change dynamically. If the capabilities of AP 110 change in a particular band, AP 110 may update its capabilities in each band for all bands, so that client 120 is updated.

In each band, AP 110 may change its working channel from time to time, for example, using the DFS procedure defined in IEEE 802.11 or any other propriety or standard suitable procedure. According to embodiments of the present invention, AP 110 may notify client 120 the working channel information of AP 110 in other bands. For example, the working channel information of AP 110 in other bands may be included in the Beacon frames. In some embodiments AP 110 may notify client 120 the working channel information of AP 110 in other bands periodically. Additionally or alternatively, AP 110 may notify client 120 the working channel information of AP 110 in another band in case AP 110 switches channel in that other band. The working channel information may include bandwidth of the channel in the other band, primary channel location and secondary channel location.

Notifying client 120 the working channel information of AP 110 in other bands may be useful in case client 120 needs to move to another band. If client 120 knows the working channel information of AP 110 in the band client 120 moves to, client 120 may not have to scan the entire band for the working channel of AP 110. Instead, client 120 may use the working channel information in the other band.

According to embodiments of the present invention, publishing, in each band the working channel information of AP 110 in other bands may shorten channel scanning by client 120. Channel scanning may refer to the procedure of scanning the channels in a band to locate the channel in which the AP is active. According to prior art, a multi-channel client would have to scan each channel in each band to obtain the working channel information of AP 110 in each band.

Figure 2:
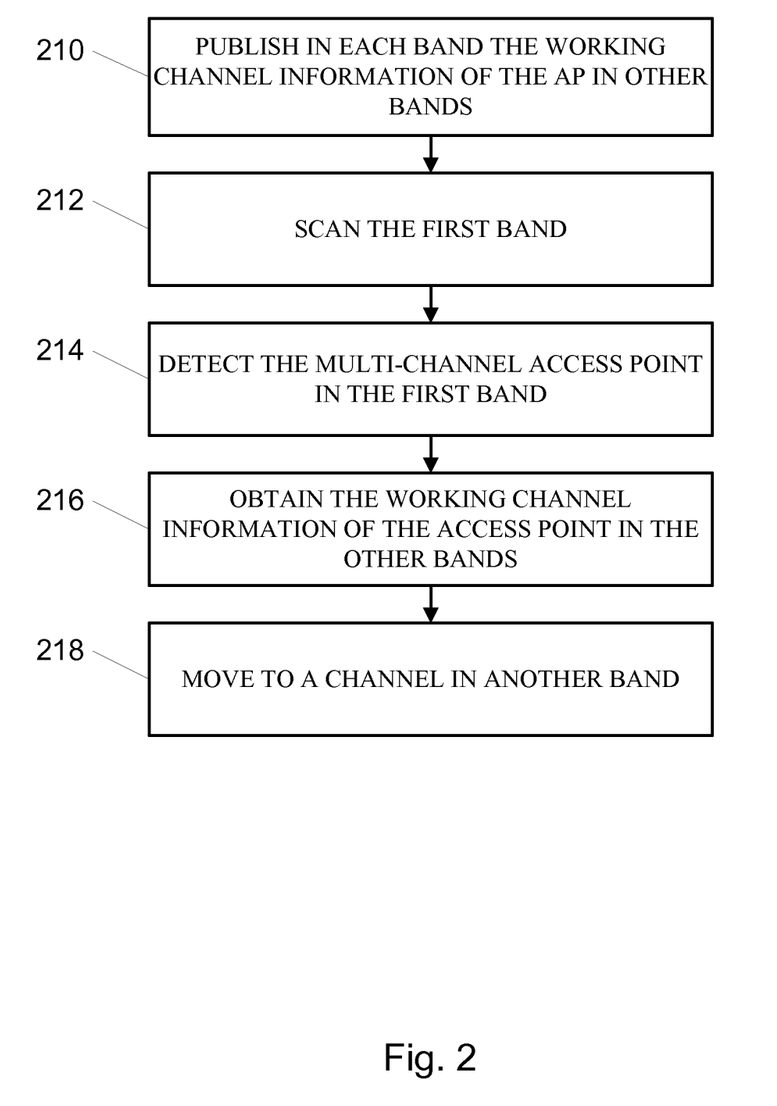
FIG. 2 is a flowchart illustration of a method for performing fast scan in a multi-band wireless communication system according to embodiments of the present invention.

Reference is now made to FIG. 2 which is a flowchart illustration of a method for performing fast scan in a multi-band wireless communication system 100 according to embodiments of the present invention. In block 210, AP 110 may publish in each band the working channel information of AP 110 in other bands. In block 212, client 120 may scan a first band. In block 214 client 120 may detect AP 110 in the first band. While in the first band, client 120 may obtain working channel information of AP 110 in the other bands, as indicated in block 216. In block 218 client 120 may move to a channel pertaining to another band, the channel indicated in the working channel information of the second band.

For example, if client 120 detects the working channel of AP 110 in other bands, for example by detecting a beacon frame in one band, then client 120 may obtain the exact channel location of the BSS in the other band, and directly jump to the indicated channel to find AP 110.

According to some embodiments of the present invention, client 120 may scan a band that has fewer channels in comparison to the other bands to get information of working channels in these other bands. This may reduce the average scanning time even further. Considering, for example, the 2.4 GHz and 5 GHz bands used by IEEE 812.11 standards. Client 120 may first scan in the 2.4 GHz band, where there are fewer channels relatively to the 5 GHz band, and then immediately jump to the channel indicated in the beacon for the 5 GHz band, thus saving client 120 the need to scan all the channels in the 5 GHz band. Another advantage is that in 2.4 GHz client 120 may perform an active scan, which is faster than a passive scan. In the 5 GHz band, regulators usually forbid the use of active scan in some of the available channels due to the need to make sure radar signals are not present in these channels before any activity in them.

Figure 3:
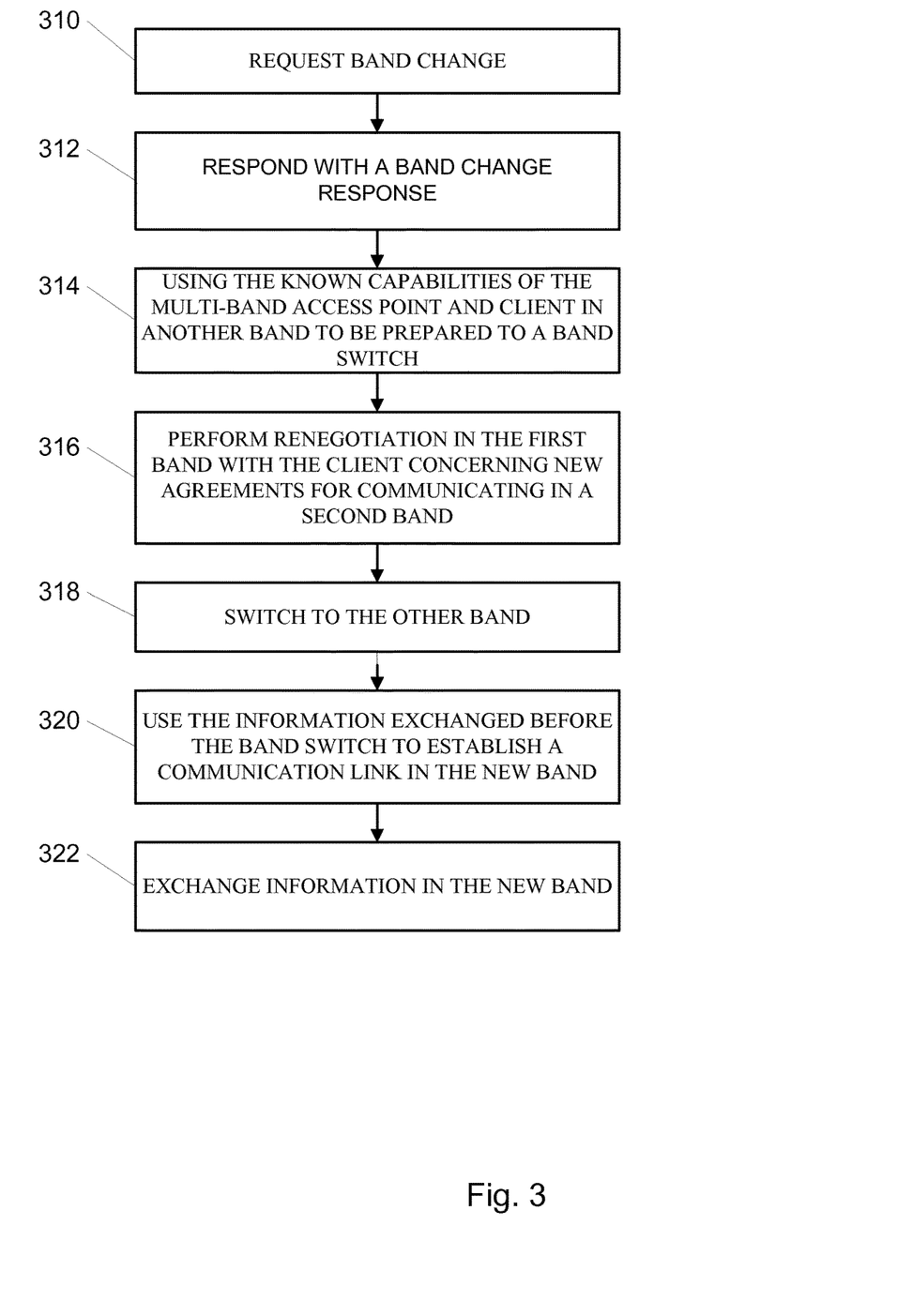
FIG. 3 is a flowchart illustration of a method for performing channel switch a multi-channel wireless communication system according to embodiments of the present invention.

Reference is now made to FIG. 3 which is a flowchart illustration of a method for performing band switch a multi-channel wireless communication system 100 according to embodiments of the present invention.

The following procedure for channel or band switch may enable a controlled and timely switch operation with built in error recovery mechanism. A similar mechanism is defined in the Tunneled Direct Link Setup (TDLS) of the 802.11 standard, with the main difference being that in the TDLS procedure both parties of the exchange, usually two client devices, jump together between channels, while in the scheme suggested hereinbelow, AP 110 is already established and works concurrently in the two bands, while client 120 needs to jump between the two bands or channels. While the specific example described hereinbelow is directed to a band switch, it should be readily understood by these skilled in the art that the band switch procedure of FIG. 3 is suitable for both channel change in the same band or for band change, mutatis mutandis.

In block 310, a band change is requested. A band change may be requested by either AP 110 or client 120. In case the request was initiated by AP 110, AP 110 may initiate band change by sending a frame with a Channel or Band Change Request. If, for example, all relevant information regarding the other band was not already sent from AP 110 to client 120, for example, in Beacon frames, before the Band Change Request, the band change request may include, inter alia, information regarding the other channel/band which may be required for the band switch operation. This information may include indication on the concurrent dual-band or dual-channel capability of AP 110, capabilities of AP 110 in channels in which AP 110 is established that pertain to other bands, working channel information, etc. In case the request was initiated by client 120, client 120 may initiate band change by sending a frame with a Band Change Request. A Band Switch Time, which indicates the time it takes client 120 to complete the band switch, may be conveyed from client 120 to AP 110 in the Band Change Request.

In block 312 a band change response is given. In an AP initiated band change, client 120 may respond with a Band Change Response. This response may be a decline, in case it is allowed for client 120 to decline, or accept. In case of acceptance client 120 may state in the response its Band Switch Time. Alternately, client 120 may reply with "momentary decline", in case client 120 cannot make the band change immediately, for example, if client 120 needs to complete a transaction with another station in its current working channel. In some embodiments client 120 may reply with a time interval after which client 120 can make the band switch. This time interval can be part of the Band Switch Time. In a client initiated band switch, AP 110 may reply with a Band Change Reply. AP 110 may either reject or accept the request for band change. In case of acceptance AP 110 may send the necessary information regarding the new channel/band in a Reply frame. Client 120 may acknowledge the Reply frame.

In case of a band switch, as indicated in block 314, client 120 may prepare in advance to the required changes in the link in the new channel. For example, preparing in advance may include allocating buffer sizes, estimating required transmit power and over the air rate, etc. Similarly, AP 110 may prepare in advance to directing client 120 to a channel pertaining to another band in terms of resource allocation in the other band.

Optionally, for substantially seamless operation, the AP-to-client link should maintain all necessary protocols to ensure continued operation in the new channel. These protocols may include, for example, security settings, block acknowledgment (block ACK) session, traffic specification (TSPEC) etc. as defined in IEEE 802.11 standard. In some implementations, for example, in a band change, some agreements (e.g. Block ACK session) would need to be renegotiated due to different capabilities in each band. In order for the band switch to be as seamless as possible, as indicated in block 316, this renegotiation may be done before actual band switch. In some cases, where renegotiation may take a long time, traffic in the original channel/band may continue to be exchanged in parallel to exchanging the frame sequence of the renegotiation. In case there are several renegotiations that need to take place, for example, one after the other, the results of the first renegotiations may not take effect in the current channel/band, and may come into effect only after the band switch. For example, in case of a band switch that necessitates renegotiation of the Block ACK agreement and the TSPEC, after Block ACK is renegotiated, traffic may still be exchanged in the original band, while the TSPEC is negotiated. This traffic should be exchanged according to the previous block ACK agreement. The new agreement should be effective only after the band switch. According to embodiments of the present invention, the Band Change Command may include the parameters for the new agreements.

After acceptance of the Band change, client 120 may make the switch within its declared Band Switch Time, as indicated in block 318. As indicated in block 320, the information exchanged before the band switch may be used to establish a communication link in the new band. As indicated in block 322 AP 110 may initiate a traffic exchange with client 120, and if new agreements were reached in block 316, using the new agreements.

According to existing wireless communication standards, such as IEEE 812.11, if client 120 wants to initiate an exchange, e,g, data transmission, after a channel/band switch, client 120 must first sense the new channel for a timer setting indicating for how much time the air medium is reserved, e.g., Network Allocation Vector (NAV) information. As used herein, NAV may refer to a timer setting, known to all active members in the network, which defines a time duration in which the air medium is reserved. After the NAV period expires, stations may try to access the channel. New NAV information is usually conveyed in each frame. Stations that receive a new frame must set their NAV according to the NAV information therein. However, after the band switch, client 120 does not know the current NAV setting, since client 120 did not receive the previous frame in the new channel. A Band Switch Probe Time timeout may be defined after which client 120 may be allowed to initiate an exchange even if it did not set its NAV. According to some embodiments of the present invention, AP 110 may notify its own NAV setting in the other band, before the band switch, e.g. in the Band Change Request, in which case client 120 may initially make use of the NAV obtained from AP 110 instead of the Band Switch Probe Time. Thus client 120 may initiate data transmission in the new band after the NAV period, received from AP 110 expires.

In case client 120 is not able to detect AP 110 within a predetermined Band Switch Timeout (which can be negotiated in the Request/Response exchange), client 120 may switch back to the original band/channel. In some embodiments client 120 may report the failure to AP 110.

Some embodiments of the present invention may be implemented in software for execution by a processor-based system, for example, AP 110 and clients 120, 122, 124, 126 and 128. For example, embodiments of the present invention may be implemented in code and may be stored on a non-transitory storage medium having stored thereon instructions which can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for supporting operation of client devices in multi-band wireless communication system, comprising:
 publishing, by a multi-band access point, in a first band, a working channel information of the multi-band access point in at least one other band to at least one client device associated with the multi-band access point, wherein the multi-band access point is operating concurrently in all different bands and wherein each band includes at least one channel,
 wherein, if the client device switches to communicate with the multi-band access point on a channel pertaining to a second band, the client device uses the working channel information and does not scan the second band for a working channel of the multi-band access point, wherein the second band is one of the at least one other band,
 wherein the publishing is done by periodically sending a Beacon frame in the first band.

2. The method of claim 1, wherein the publishing is done as a response to a request of the client device.

3. The method of claim 1, further comprising:
 publishing by the multi-band access point, in the first band, capabilities of the multi-band access point in the at least one other band.

4. The method of claim 1, wherein publishing the working channel information to the client device is performed in case the multi-band access point switches channel in the at least one other band.

5. The method of claim 1, wherein the working channel information comprises bandwidth of the at least one other channel, primary channel location and secondary channel location.

6. The method of claim 1, further comprising:
 scanning by the client device the first band;
 detecting the multi-band access point in the first band by the client device; and
 obtaining by the client device from the multi-band access point the working channel information of the access point in the at least one other band.

7. The method of claim 6, comprising:
 moving, by the client device, to a channel pertaining to the second band, the channel indicated in the working channel information of the second band, wherein the second band is one of the at least one other band.

8. The method of claim 7, wherein the first band has fewer channels than the second band.

9. The method of claim 3, wherein the capabilities of the multi-band access point comprise Quality of Service information of the multi-band access point in the at least one other band.

10. The method of claim 9, further comprising:
 deciding by the client device to which of the bands to associate, based on the Quality of Service information.

11. A method for supporting operation of client devices in multi-band wireless communication system, comprising:
 publishing by a multi-band access point, in a first band, a working channel information of the multi-band access point in at least one other band to at least one client device associated with the multi-band access point,
 obtaining at the multi-band access point from the client device link quality metrics of the client device in a first channel pertaining to a first band and in at least one other channel pertaining to a second band, wherein the second band is one of the at least one other band;
 allocating the client device to a selected channel from any band supported by the multi-band access point based on the link quality; and
 steering the client device to the selected channel,
 wherein the multi-band access point is operating concurrently in all different bands and wherein each band includes at least one channel,
 wherein obtaining the quality metrics of the client device in the at least one other channel pertaining to the second band comprises:
 associating the client device to the first channel;
 measuring by the client device the link quality metrics of the client device in the first channel;
 instructing the client device to move to another channel; and
 repeating the steps of associating, measuring and instructing for a plurality of channels.

12. The method of claim 11, wherein the link quality metrics are selected from the list consisting of: link budget and interference condition.

13. The method of claim 11, further comprising:
 planning a load balancing scheme based on the link quality metrics, wherein allocating the client device to the selected channel is based on a load balancing scheme.

14. The method of claim 11, further comprising:
deciding whether to admit a particular stream based on the link quality metrics of the client.

15. The method of claim 1, further comprising:
performing renegotiation with the client device concerning new agreements for communicating in the second band, the renegotiation being performed in the first band, wherein the second band is one of the at least one other band;
associating the client device to the second band; and
exchanging traffic in the second band using the new agreements.

16. The method of claim 15, wherein associating the client device comprises:
sending by the multi-band access point to the client device a band change request, wherein the band change request comprises the new agreements.

17. The method of claim 15, wherein the new agreements are selected from the list consisting of:
security settings, block acknowledgment (block ACK) session, traffic specification (TSPEC).

18. The method of claim 1, further comprising:
notifying the multi-band access point by the client device, capabilities of the client device in the at least one other band.

19. The method of claim 18, further comprising:
requesting the client device by the multi-band access point to provide the multi-band access point the capabilities of the client device in the at least one other band.

20. The method of claim 18, wherein the capabilities of the client device comprise supported modulation and coding schemes and a number of supported spatial streams.

21. The method of claim 18, further comprising:
using, by the multi-band access point, the capabilities of the client device in the second band to plan resource allocation in the second band before switching to a second channel, wherein the second channel pertains to the second band, and wherein the second band is one of the at least one other band.

22. The method of claim 18, further comprising:
deciding by the multi-band access point to switch band for the client device based on the capabilities of the client device in the at least one other band.

23. The method of claim 18, wherein notifying the multi-band access point, the capabilities of the client device in the at least one other band is done following a change in the capabilities of the client in one of the at least one other band.

24. The method of claim 1, further comprising: publishing by the multi-band access point, in the first band, the multi-band access point capability of concurrent dual band.

25. The method of claim 24, further comprising:
concluding by the client device that the access point has scanned for radars in the at least one channel and that the at least one other channel is radar free; and
avoiding scanning for radars when being switched to one of the of at least one other channel,
wherein said channel pertains to the second band and wherein the second band is one of the at least one other band.

26. The method of claim 3, wherein said capabilities comprise:
a timer setting which defines a time duration in which the air medium is reserved in the second band, before a band switch, wherein the second band is one of the at least one other band.

27. The method of claim 26, further comprising:
switching to the second band; and
initiating data transmission by the client in the second band after the timer setting expires.

28. The method of claim 1, wherein the said publishing is initiated by the multi-band access point.

29. The method of claim 1, wherein the said publishing is initiated by the client device.

30. The method of claim 3, wherein the publishing of the capabilities is done following a change in the capabilities of the multi-band access point in one of the at least one other band.

31. The method of claim 3, further comprising:
using, by the client device, the capabilities of the multi-band access point in the at least one other band to perform activities required for operating in the second band, before moving to the second band, wherein these activities require knowledge of the capabilities of the access point in second band, and wherein the second band is one of the at least one other band.

* * * * *